Dec. 4, 1962  R. G. CRAIG  3,066,926
AIR HEATING METHOD
Filed April 23, 1959  2 Sheets-Sheet 1
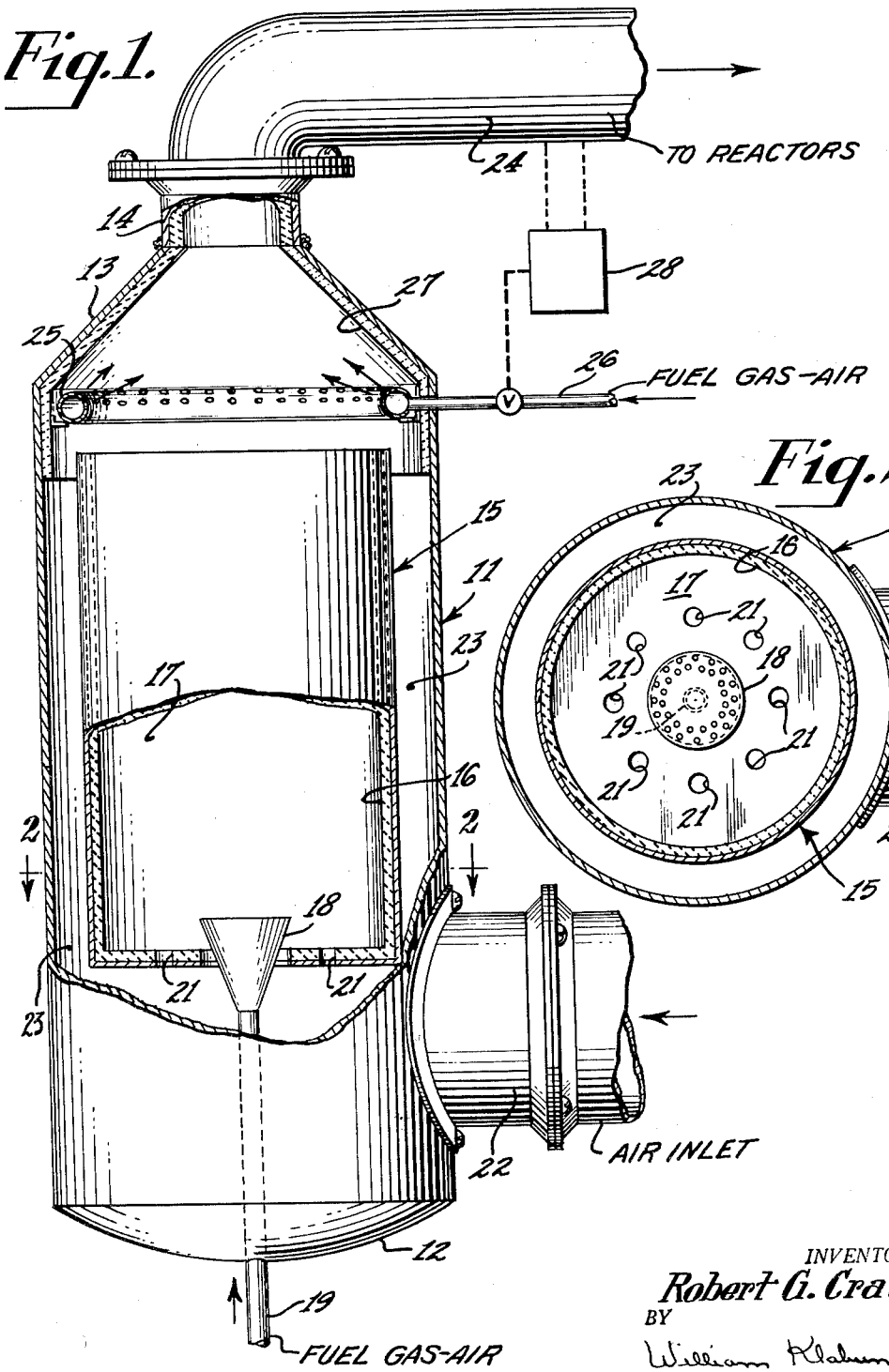
INVENTOR.
Robert G. Craig
BY
William Klabunde
ATTORNEY.

Dec. 4, 1962  R. G. CRAIG  3,066,926
AIR HEATING METHOD
Filed April 23, 1959  2 Sheets-Sheet 2

INVENTOR
ROBERT G. CRAIG

BY *William Klabunde*

ATTORNEY 3,066,926
AIR HEATING METHOD
Robert G. Craig, Wilmington, Del., assignor to Air Products and Chemicals, Inc., a corporation of Delaware
Filed Apr. 23, 1959, Ser. No. 808,427
4 Claims. (Cl. 263—19)

This invention relates to a method for heating air to be distributed to a plurality of reactors or other treating vessels, and is particularly concerned with the heating, transportation and distribution of the heated air to each of the treating vessels so that substantially uniform temperature conditions are maintained in the air streams entering the several treating vessels.

While the invention has broad application to the air heating and distribution requirements of treating processes in general, that is, wherever it is desirable or essential to avoid a sharp or a large temperature gradient in the air stream entering the vessel, it is contemplated as having a specially advantageous application to hydrocarbon conversion processes wherein considerable quantities of heated air are required to reheat and reactivate large beds of granular catalyst which have become heat deficient as a result of the heat absorbed from the catalyst bed during previous endothermic hydrocarbon conversion treatments in the presence of the catalyst mass. In such latter application, however, it is not to be assumed that the invention is limited to the heat recuperation of cooled, spent catalytic material, since the invention may be employed for the heating of air and for other purposes, such as in the treatment of the catalytic material in the process of manufacture.

Air heaters employed for the aforementioned purposes generally comprise relatively large structures capable of handling considerable quantities of air and of heating the air to relatively high temperature, such as in excess of 1000° F. Because of the huge size of the treating vessels in a typical hydrocarbon conversion unit, such as a dehydrogenation reactor, and the considerable amounts of air required, the air heater is necessarily of large capacity and it requires large-size pipes or ducts, such as 4' to 6' in diameter, to distribute the heated air to the treating vessels.

In units involving multiple reactors operating in timed sequence and requiring extensive systems of large-size piping for distributing the heated air to the reactors, there are special problems in the matter of supplying air at the same temperature to each of the reactors, particularly in close-coupled systems where the length of run from the air heater to the nearest reactor is relatively short.

While the problem is general to most heaters, it is especially serious when the air heater is of the type that divides the incoming air stream for primary combustion and blending purposes, the cool quench air being made to flow around the combustion chamber for the purpose of cooling the combustion chamber shell and moderating the temperature of combustion gases by being admixed with the combustion products before discharge from the heater vessel. With large-size ducts and high gas velocities, such as 300–500 ft./sec., the gas leaving the air heater as a stream having a hot core and a cooler envelope does not have sufficient opportunity to mix and be equalized in temperature before it reaches the first reactor. Thus, there is a temperature stratification in the heated air stream, which may cause a serious heat unbalance in the reactor units. In dehydrogenation reactions this would produce increased cracking and coke deposition in the reactors receiving the hotter air, and poor conversion and inadequate coke deposition in the reactors receiving the cooler air, with resultant lower production of desirable unsaturates in the cooler reactors.

Method and apparatus for overcoming this difficulty are disclosed in copending application, Serial Number 808,428, now abandoned, for improvements in an Air Heater filed concurrently herewith in the name of Numer M. Kapp, in which it is proposed that adjacent to the discharge outlet of the air heater, the central hot core of combustion gases flowing axially through the heater vessel be thoroughly admixed with the annular stream of quench air flowing around the outer shell of the internal combustion chamber and serving to cool such shell. To effect the desired mixing of the separate quench and combustion gas streams, one stream, at higher pressure, is jetted into the other through ports in a baffle located at the juncture of the two streams. This device, however, may have certain limitations where pressure drop considerations are important. Where conditions are such that any appreciable pressure drop is undesirable, the degree of jet action that may be provided within the pressure drop limits may be insufficient for adequate mixing of the hot and cold air streams before they reach the point of initial use beyond the discharge end of the air heater. Inasmuch as air heaters are commonly located at the shortest practicable distance from the group of reactors or other vessels utilizing the heated air stream, the matter of efficiently mixing the quench and flue gas streams within the air heater so as to provide the desired uniform temperature is a problem.

In accordance with the present invention, the hot core of combustion gases leaving the internal combustion chamber flow, as before, directly to and through the air heater outlet which is located a short distance beyond the open discharge end of the internal combustion chamber. In the mixing zone or region of the air heater, between the end of the combustion chamber and the heater outlet, that is, where the quench air flows inwardly to join the hot stream of combustion gases, the invention contemplates the addition of supplemental heat, as by one or more heating elements capable not only of rapidly heating a substantial portion of the annular stream of cooler quench air, but also of providing a certain degree of agitation in the combining air streams so that efficient mixing thereof is more effectively promoted.

In a preferred embodiment of the invention such supplemental heating is provided by a burner ring, or a plurality of separate burner elements placed within or distributed about the region where the application of supplemental heat is most desired. In the case of a burner ring, it may be supported concentrically within the heater in such a position that the flame jets will be directed into the annular stream of quench air as it flows inwardly toward the axis of the vessel to merge with the hot combustion products discharging from the internal combustion chamber. Where a plurality of individual burner units are employed, the separate units may be supported at spaced locations around the inner wall of the vessel in the region where the wall converges toward the hot air outlet, as well as in the outlet duct itself. It is contemplated that any such additional burner capacity near the outlet of the heater may permit a reduction in the burner requirements within the main combustion chamber. In any case, the supplemental burner units should be of such design and placement as to avoid appreciable flame damage to the inner wall surfaces of the heater vessel in the areas around the hot air outlet, and the heating and mixing of the gases should be accomplished without causing excessive agitation within the gas stream, thereby avoiding an undesirable pressure drop while supplying heat in the low heat area of the gas stream to give the desired temperature within an optimum mixing of gases.

For a fuller understanding of the invention, reference may be had to the following specification and claims taken in connection with the accompanying drawing forming part of this application, in which:

FIG. 1 is a diagrammatic sectional elevation of a typical air heater to which the invention may be applied;

FIG. 2 is a sectional plan view taken along the line 2—2 of FIG. 1;

Figure 3:
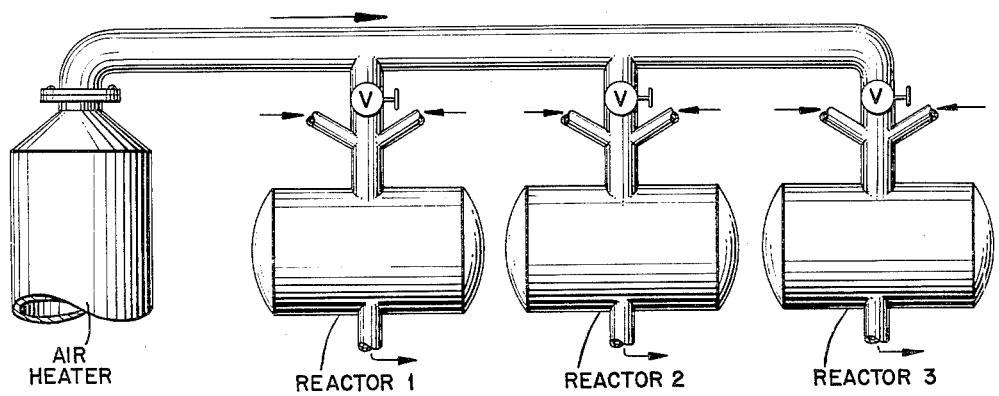
FIG. 3 is a diagrammatic view showing a close-coupled arrangement of three reactors supplied with heated air from a common air heater and distributing duct.

In the drawing, the air heater comprises an outer cylindrical shell 11 having a dished lower end 12 and a frusto-conical upper end 13 terminating in an outlet nozzle 14 located on the axis of the shell. Since the type of air heater illustrated will be familiar to those skilled in the art, the drawing is merely diagrammatic and shows only those details necessary to a complete understanding of the invention. While not so limited, the air heater will be considered as being up-fired, that is, set vertically.

Concentrically positioned within the main outer shell 11 there is a second smaller and shorter cylindrical shell 15 closed at its lower end and suitably lined with refractory material 16 so as to provide an internal combustion chamber 17. The lower end of the combustion chamber is provided with a main burner 18, supplied with a fuel gas-air mixture through inlet conduit 19, and a series of openings 21 through which air for supplementary combustion purposes is introduced from the bottom region of the outer shell 11. The bottom region of outer shell 11 is supplied with air through inlet 22. The incoming air stream is divided by suitable damper or by-pass arrangements of known design, not shown, so that part of the cold air flows into the combustion chamber through the openings 21 and the remaining part flows upwardly around the outside of the combustion chamber, that is, through annular passageway 23 formed between the shells 11 and 15. The purpose for passing air upwardly around the outside of the combustion chamber is to cool the shell 15 because of the high temperatures, such as 2000–2500° F., attained within the combustion chamber 17.

In the upper region of the main vessel 11 the annular stream of quench air flowing through annular passageway 23 merges with the central stream of hot combustion products or flue gas discharging from the combustion chamber 17 and the combined stream flows toward outlet nozzle 14 at the top of the heater. The discharged air stream is conveyed from the air heater to the group or battery of reactors, not shown, through conduit 24.

The apparatus thus far described is conventional, and operates satisfactorily in many specific applications. It does have limitations, however, in operations where it is essential to rapidly distribute huge quantities of heated air at substantially uniform temperature to a group of treating units located in relatively close proximity to the air heater. The following modification of the heater is for the purpose of overcoming the difficulties with respect to temperature differentials between the outer and the inner portions of the discharging heated air stream.

In the upper region of the vessel 11, such as at the approximate level where the outer annular stream of cooler quench air converges toward the outlet nozzle 14, there is provided a ring burner 25, supported in suitable manner from the walls of vessel 11 and supplied with a valve-controlled fuel gas-air line 26 extending through the side of vessel 11. The ring burner 25 is preferably so constructed and arranged that the flame jets will be directed in the general direction of cold air flow toward the upper central region of the vessel 11, and away from direct impingement on the refractory lining 27 of vessel 11 and nozzle 14. Ring burner 25 serves only as an auxiliary burner for the purpose of warming the annular stream of cooler quench gas rising through passageway 23 as such stream moves inwardly to join the hotter combustion gases rising from the chamber 17. The jet action of the burners assists in physically mixing the two streams as they flow together.

Figure 4:
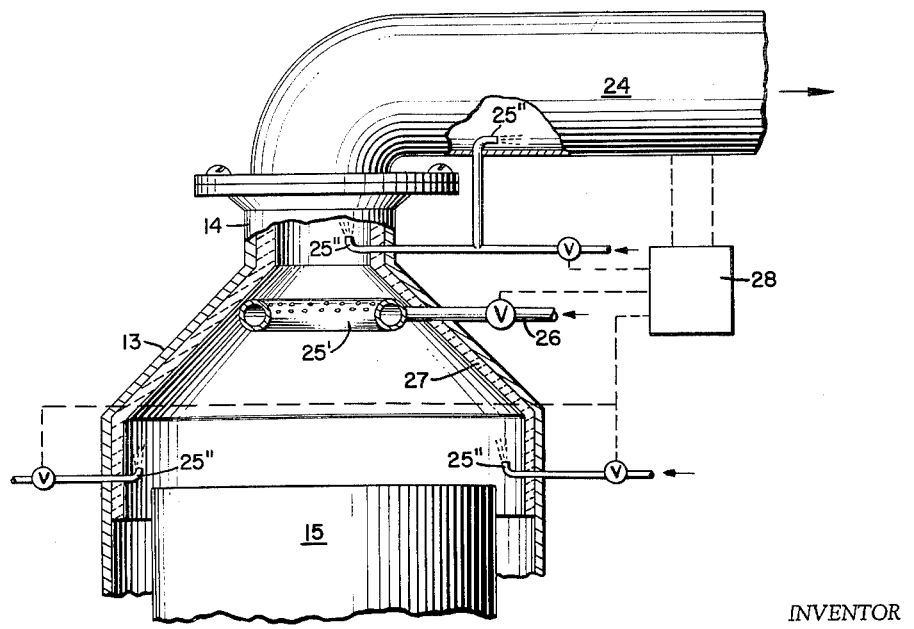
FIG. 4 is a sectional partial elevation of the discharge end of the heater shown in FIG. 1, with alternative supplementary heaters for accomplishing temperature equalization in the outgoing heated air stream.

In the alternative arrangement illustrated in FIG. 4, a smaller auxiliary ring burner is placed nearer the outlet nozzle 14, as indicated at 25'. In any case, the optimum location or position for the ring burner 25 or 25' will depend on various factors, such as the amount of auxiliary heat to be provided, the velocity of gas flow past the burner ring, and the susceptibility of the internal insulation 27 to damage if the burner is too close to the insulation. Firing of the auxiliary burner may be controlled in any suitable manner by control equipment of known design, a possible location of which may be as diagrammatically illustrated at 28.

It is contemplated that the auxiliary burners preferably would not be operated in an on-and-off manner, but, once ignited, the intensity of the flame would be modulated up and down, dependent upon the temperature requirements of the system. Such control would be derived from downstream sensing devices, such as thermocouples, located at one or more points along the header 24. At such points the sensing devices may be spaced along a diameter of the header, so as to record the temperature gradient across the header as well as the temperature gradient downstream to the reactors. The intensity of the burner flame may then be adjusted to produce the optimum small temperature gradient downstream from the burner-mixer.

As an alternative to the use of ring burners, such as 25 and 25', individual auxiliary burner units, illustrated at 25", may be employed. Units 25" are attached at selected locations around the inner wall of vessel 11 at a level above the discharge end of the combustion chamber, and/or possibly at one or more locations along the inner walls of the air outlet nozzle 14 and its associated conduit 24. Any burners located within nozzle 14 or conduit 24 should be placed preferentially at the side to which the first branch take-off line is connected, if they are not distributed uniformly within the nozzle or conduit.

Such preferential placement of the burner units is desirable for the reason that the discharging air stream may otherwise have an envelope of cooler air which will be drawn into the first branch line that the stream reaches. The reactor served by such first branch line may thus receive air predominantly composed of the cooler air travelling along the wall of the main supply duct 24 at the side to which the first branch line is connected.

It is to be understood that control of the auxiliary burners may be wholly automatic or may be hand operated in response to indicated temperature differentials.

Obviously many modifications and variations of the invention as hereinbefore set forth may be made without departing from the spirit and scope thereof, and therefore only such limitations should be imposed as are indicated in the appended claims.

What is claimed is:

1. In a close-coupled system of multiple treating zones requiring the distribution thereto of relatively large quantities of hot air, wherein the velocity of the distributed hot air is such as to afford insufficient residence time within the communicating ducts to effect a uniform transverse temperature pattern across the flowing stream of heated air, the method of rapidly heating a high velocity stream of said air and effecting a uniform temperature pattern therein with a minimum distance of travel toward the points of distribution, which method comprises the steps of: passing a portion of said air, as combustion air, together with a heating fuel through an elongated confined combustion zone; passing the remaining portion of said air, as quench air, in a confined annular stream surrounding said combustion zone; merging the separate streams of quench air and gaseous products of combustion within a mixing zone immediately beyond the discharge end of said combustion zone by progressively converging said annular stream of quench air transversely toward and into said gaseous products of combustion thereby to form a confined discharge stream of mixed gas of substantially reduced cross section; passing the resultant confined stream of mixed gas to said treating zones; and introducing supplementary heat by combustion of additional fuel in at least one location within the initial portion of the path of flow of said mixed gas, said additional fuel being discharged into said converging stream in the direction of flow of said stream and inwardly toward the axis of flow of said stream so as to heat the annular stream of quench air during such converging.

2. The method as in claim 1 in which said supplementary heat is applied to said mixture prior to complete admixing and temperature equalization and within the cooler regions thereof.

3. The method as in claim 1 in which at least a portion of said supplementary heat is applied to the confined discharge stream of reduced cross section at the side thereof from which the initial take-off is effected in distributing said air to said treating zones.

4. The method as defined in claim 1 in which said supplementary heat is applied to said mixed gas prior to complete admixing and temperature equalization and within the cooler regions thereof, and at a plurality of uniformly distributed locations within the converging annular envelope of quench air, said locations being substantially wholly within said mixing zone.

References Cited in the file of this patent

UNITED STATES PATENTS

| | | |
|---|---|---|
| 1,393,654 | Wales | Oct. 11, 1921 |
| 1,585,410 | Olofson | May 18, 1926 |
| 2,168,313 | Bichowsky | Aug. 8, 1939 |
| 2,679,137 | Probert | May 25, 1954 |
| 2,704,435 | Allen | Mar. 22, 1955 |
| 2,720,753 | Sharpe | Oct. 18, 1955 |